United States Patent
Luo et al.

(10) Patent No.: US 7,443,051 B2
(45) Date of Patent: *Oct. 28, 2008

(54) SYSTEM AND METHOD FOR PROVIDING ADAPTIVE POWER SUPPLY TO SYSTEM ON A CHIP

(75) Inventors: Wenzhe Luo, Shanghai (CN); Paul Ouyang, Shanghai (CN); Feng Chen, Shanghai (CN)

(73) Assignee: Semiconductor Manufacturing International (Shanghai) Corporation, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 11/743,134

(22) Filed: May 1, 2007

(65) Prior Publication Data

US 2007/0262647 A1   Nov. 15, 2007

Related U.S. Application Data

(63) Continuation of application No. 11/251,583, filed on Oct. 13, 2005, now Pat. No. 7,233,868.

(30) Foreign Application Priority Data

Sep. 15, 2005  (CN) .................... 2005 1 0029766

(51) Int. Cl.
*H02J 1/10* (2006.01)
(52) U.S. Cl. ........................ 307/18; 307/28
(58) Field of Classification Search ............... 307/18, 307/28
See application file for complete search history.

(56) References Cited

U.S. PATENT DOCUMENTS 7,233,868 B2 *   6/2007   Luo et al. .................... 702/64

* cited by examiner

*Primary Examiner*—Robert L. Deberadinis
(74) *Attorney, Agent, or Firm*—Townsend and Townsend and Crew LLP

(57) ABSTRACT

A system and method for adaptively providing a power supply voltage. The system includes an input/output subsystem configured to receive a first voltage, an analog subsystem configured to receive a second voltage and coupled to the input/output subsystem, a first digital subsystem configured to receive a third voltage and coupled to the input/output subsystem, and a second digital subsystem configured to receive a fourth voltage and coupled to the input/output subsystem, the first digital subsystem, and the analog subsystem.

12 Claims, 5 Drawing Sheets

SYSTEM AND METHOD FOR PROVIDING ADAPTIVE POWER SUPPLY TO SYSTEM ON A CHIP

CROSS-REFERENCES TO RELATED APPLICATIONS

This application is a continuation of U.S. patent application Ser. No. 11/251,583, filed Oct. 13, 2005, which claims priority to Chinese Patent Application No. 200510029766.3, filed Sep. 15, 2005. Both applications are commonly assigned and incorporated by reference herein for all purposes.

The following two commonly-owned applications, including the parent application to which this application claims priority, were filed concurrently and the other one is hereby incorporated by reference in its entirety for all purposes:

1. U.S. patent application Ser. No. 11/251,107, in the name of Wenzhe Luo, Paul Ouyang, and Feng Chen, titled, "System and Method for Adaptive Power Supply to Reduce Power Consumption," and 2. U.S. patent application Ser. No. 11/251,583, in the name of Wenzhe Luo, Paul Ouyang, and Feng Chen, titled, "System and Method for Providing Adaptive Power Supply to System on a Chip."

STATEMENT AS TO RIGHTS TO INVENTIONS MADE UNDER FEDERALLY SPONSORED RESEARCH OR DEVELOPMENT

Not applicable

REFERENCE TO A "SEQUENCE LISTING," A TABLE, OR A COMPUTER PROGRAM LISTING APPENDIX SUBMITTED ON A COMPACT DISK

Not applicable

BACKGROUND OF THE INVENTION

The present invention is directed to integrated circuits. More particularly, the invention provides a system and method for adaptive power supply. Merely by way of example, the invention has been applied to system on a chip. But it would be recognized that the invention has a much broader range of applicability.

Integrated circuits or "ICs" have evolved from a handful of interconnected devices fabricated on a single chip of silicon to millions of devices. Current ICs provide performance and complexity far beyond what was originally imagined. In order to achieve improvements in complexity and circuit density (i.e., the number of devices capable of being packed onto a given chip area), the size of the smallest device feature, also known as the device "geometry", has become smaller with each generation of ICs. Semiconductor devices are now being fabricated with features less than a quarter of a micron across.

Increasing circuit density has not only improved the complexity and performance of ICs but has also provided lower cost parts to the consumer. An IC fabrication facility can cost hundreds of millions, or even billions, of dollars. Each fabrication facility will have a certain throughput of wafers, and each wafer will have a certain number of ICs on it. Therefore, by making the individual devices of an IC smaller, more devices may be fabricated on each wafer, thus increasing the output of the fabrication facility. Making devices smaller is very challenging, as a given process, device layout, and/or system design often work down to only a certain feature size.

An example of such a limit is power consumption of an integrated circuit system. The power consumption has increased as the performance of the integrated circuit system has improved. But the integrated circuit system is often required to consume a low level of power. For example, the integrated circuit system is portable and thus relies on battery power supply. The portable system may be a laptop computer, a personal data assistant (PDA), a cell phone, a digital camera, a camcorder, or any other device.

These competing demands for high performance and low power consumption have placed significant constraints on system design. Consequently, certain conventional techniques have been used to reduce power consumption. For example, the system turns off some parts that are not in use. In another example, the clock frequency for the system is reduced when the system does not have to perform many tasks. The clock speed often needs to be high enough to support the system for necessary functions. In yet another example, the clock frequency for the system is adjusted based on at least information associated with a workload of the system. In yet another example, the design architecture of the system is modified in order to efficiently utilize the current. In yet another example, the circuit design or device layout is modified to reduce the unused current. In yet another example, the device design is changed to lower the leakage current. But these techniques often increases system complexity with limited effectiveness.

From the above, it is seen that an improved technique for power supply is desired.

BRIEF SUMMARY OF THE INVENTION

The present invention is directed to integrated circuits. More particularly, the invention provides a system and method for adaptive power supply. Merely by way of example, the invention has been applied to system on a chip. But it would be recognized that the invention has a much broader range of applicability.

In a specific embodiment, the invention provides a system for adaptively providing a power supply voltage. The system includes an input/output subsystem configured to receive a first voltage, an analog subsystem configured to receive a second voltage and coupled to the input/output subsystem, a first digital subsystem configured to receive a third voltage and coupled to the input/output subsystem, and a second digital subsystem configured to receive a fourth voltage and coupled to the input/output subsystem, the first digital subsystem, and the analog subsystem. Additionally, the system includes a first adaptive power supply configured to receive an input voltage and generate the third voltage, and a second adaptive power supply configured to receive the input voltage and generate the fourth voltage. The first digital subsystem is configured to receive a clock signal associated with a clock frequency, and the first adaptive power supply is further configured to adjust the third voltage based on at least information associated with a comparison of a first frequency and the clock frequency.

According to yet another embodiment, a system for adaptively providing a power supply voltage includes an input/output subsystem configured to receive a first voltage, an analog subsystem configured to receive a second voltage and coupled to the input/output subsystem, a first digital subsystem configured to receive a third voltage and coupled to the input/output subsystem, and a second digital subsystem configured to receive a fourth voltage and coupled to the input/output subsystem, the first digital subsystem, and the analog subsystem. The first digital subsystem includes a first critical path associated with a first time delay, and the second digital subsystem includes a second critical path associated with a second time delay. The third voltage is determined based on at least information associated with the first time delay, and the fourth voltage is determined based on at least information associated with the second time delay.

According to yet another embodiment, a method for adaptively providing a power supply voltage includes determining an input/output component, an analog component, and a digital component. The input/output component, the analog component, and the digital component are parts of a system. Additionally, the method includes processing information associated with the digital component, and determining a plurality of digital blocks based on at least information associated with the digital component. The digital component includes the plurality of digital blocks, and each of the plurality of digital blocks includes at least a part of a digital circuit. Moreover, the method includes processing information associated with the plurality of digital blocks, and determining a plurality of signal time delays associated with a plurality of critical paths corresponding to the plurality of digital blocks respectively based on at least information associated with the plurality of digital blocks. Also, the method includes processing information associated with the plurality of signal time delays, and forming a plurality of digital subsystems based on at least information associated with the plurality of signal time delays. Each of the plurality of digital subsystems includes one or more digital blocks. Additionally, the method includes providing a plurality of power supplies to the plurality of digital subsystems respectively. Each of the plurality of digital subsystems includes a critical path associated with a time delay, and each of the plurality of power supplies outputs a first voltage to corresponding one of the plurality of digital subsystems. The first voltage is determined based on at least information associated with the corresponding time delay.

Many benefits are achieved by way of the present invention over conventional techniques. Some embodiments of the present invention can adaptively provide power supply voltages to a system on a chip, and thus significantly reduce power consumption of the system. Certain embodiments of the present invention divide a system-on-a-system chip into several subsystems. For example, the subsystems include an input/output subsystem, an analog subsystem, and one or more digital subsystems. In another example, the input/output subsystem and the analog subsystem are provided with constant supply voltages. In yet another example, each of the one or more digital subsystems is powered by an adaptive power supply system. Some embodiments of the present invention provide digital signal connections between different power domains. For example, the digital signal connections include level-shifters to protect signal integrity and/or eliminate DC current.

Various additional objects, features and advantages of the present invention can be more fully appreciated with reference to the detailed description and accompanying drawings that follow.

DETAILED DESCRIPTION OF THE INVENTION

The present invention is directed to integrated circuits. More particularly, the invention provides a system and method for adaptive power supply. Merely by way of example, the invention has been applied to system on a chip. But it would be recognized that the invention has a much broader range of applicability.

Figure 1:
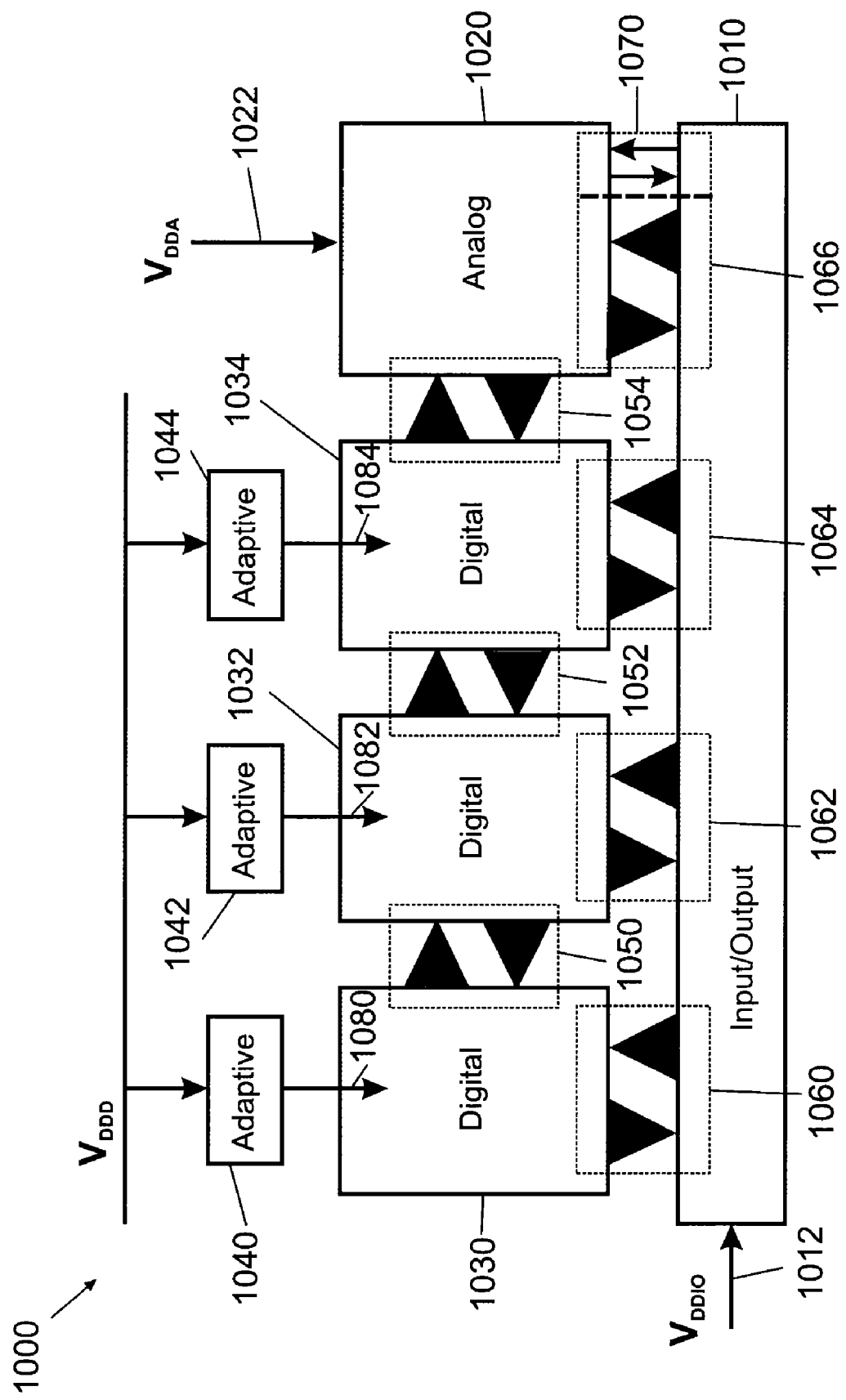
FIG. 1 is a simplified diagram for system on a chip with adaptive power supply according to an embodiment of the present invention.

FIG. 1 is a simplified diagram for system on a chip with adaptive power supply according to an embodiment of the present invention. This diagram is merely an example, which should not unduly limit the scope of the claims. One of ordinary skill in the art would recognize many variations, alternatives, and modifications. The system 1000 includes the following components:

1. Input/output subsystem 1010;
2. Analog subsystem 1020;
3. Digital subsystems 1030, 1032, and 1034;
4. Adaptive power supplies 1040, 1042, and 1044;
5. Digital signal connections 1050, 1052, 1054, 1060, 1062, 1064, and 1066;
6. Analog signal connections 1070.

Although the above has been shown using a selected group of components for the system 1000, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

The input/output subsystem 1010 is provided with a power supply voltage 1012 of $V_{DDIO}$, and the analog subsystem 1020 is provided with a power supply voltage 1022 of $V_{DDA}$. The digital subsystems 1030, 1032, and 1034 are provided with power supply voltages 1080, 1082, and 1084 from the adaptive power supplies 1040, 1042, and 1044 respectively. Each of the adaptive power supplies 1040, 1042, and 1044 converts a power supply voltage 1046 of $V_{DDD}$ to the power supply voltage 1080, 1082, or 1084 as shown in FIG. 1.

Each of the digital subsystems 1030, 1032, and 1034 includes a critical path. For example, the critical path of the digital subsystem 1030 has a signal time delay that is longer than the signal time delay of any other signal path of the digital subsystem 1030. The signal time delays of the critical paths are used by the power supplies 1040, 1042, and 1044 to adaptively provide the power supply voltages 1080, 1082, and 1084 respectively. For example, the power supply 1040 converts the power supply voltage 1046 of $V_{DDD}$ to the power supply voltage 1080 based on at least the signal time delay of the critical path of the digital subsystem 1030.

In one embodiment, each of the digital subsystems 1030, 1032, and 1034 includes one or more digital circuit blocks. These digital circuit blocks have their individual critical paths with individual signal time delays. The critical path of the digital subsystem 1030, 1032, or 1034 has a signal time delay that is equal to or longer than the individual signal time delays of the corresponding digital subsystem. For example, the critical path of the digital subsystem 1030 has a signal time delay that is equal to or longer than the individual signal time delays of the digital circuit blocks that are parts of the digital subsystem 1030.

In another embodiment, the input/output subsystem 1010, the analog subsystem 1020, and the digital subsystems 1030, 1032, and 1034 are components of a system on a chip. In the system-on-a-chip design, the circuits are built into a hierarchy of circuit blocks. Different digital blocks include individual critical paths that have different, similar, or same individual signal time delays. The digital blocks are partitioned into the digital subsystems 1030, 1032, and 1034 according to at least the individual time delays of the individual critical paths. For example, each of the digital subsystems 1030, 1032, and 1034 includes digital blocks whose individual critical paths have similar individual signal time delays. In another example, the individual time delays of the digital blocks for a digital subsystem are significantly different from the individual time delays of the digital blocks for another digital subsystem.

The digital signal connections 1050, 1052, and 1054 can carry digital signals between the digital subsystems 1030 and 1032, between the digital subsystems 1032 and 1034, and between the digital subsystem 1034 and the analog subsystem 1020 respectively. Additionally, the digital signal connections 1060, 1062, 1064, and 1066 can carry digital signals between the digital subsystem 1030 and the input/output subsystem 1010, between the digital subsystem 1032 and the input/output subsystem 1010, between the digital subsystem 1034 and the input/output subsystem 1010, and between the analog subsystem 1020 and the input/output subsystem 1010 respectively. For example, some or all of the digital signal connections 1050, 1052, 1054, 1060, 1062, 1064, and 1066 each include one or more level shifters for power level conversion. Moreover, the analog signal connection 1070 can carry analog signals between the analog subsystem 1020 and the input/output subsystem 1010.

As discussed above and further emphasized here, FIG. 1 is merely an example, which should not unduly limit the scope of the claims. One of ordinary skill in the art would recognize many variations, alternatives, and modifications. For example, one or more additional digital subsystems and their corresponding adaptive power supplies can be inserted to the system 1000.

In another example, one or more of the digital subsystems 1030, 1032, and 1034 and one or more of their corresponding adaptive power supplies 1040, 1042, and 1044 are removed from the 1000. In yet another example, increasing the number of digital subsystems and their corresponding adaptive power supplies can lower the power consumption of these subsystems but also increase the system overhead in the form of adaptive power supplies and digital signal connections. For example, the system overhead includes extra power consumption and/or extra chip area.

Figure 2:
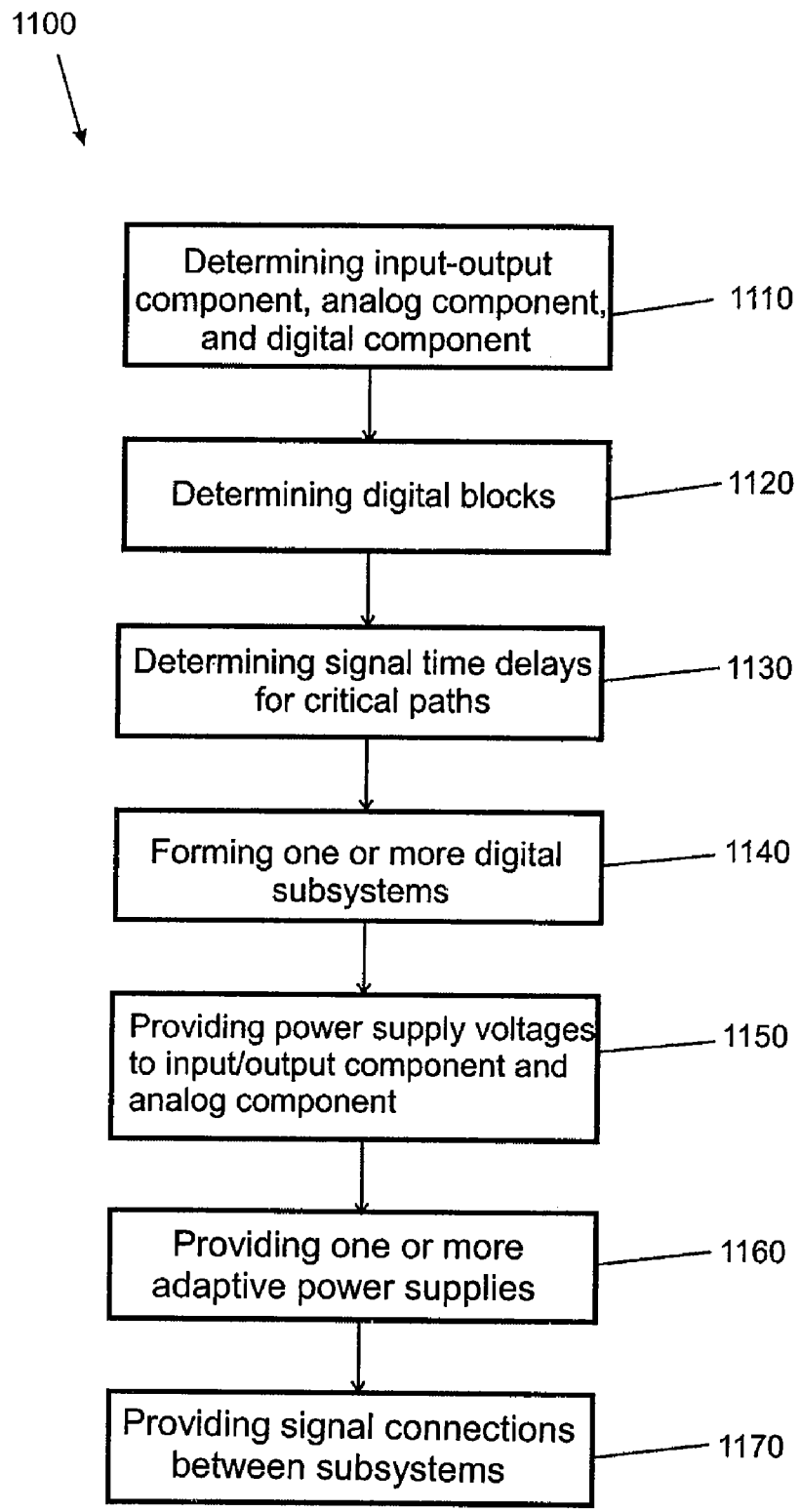
FIG. 2 is a simplified method for providing adaptive power supply to system on a chip according to an embodiment of the present invention.

FIG. 2 is a simplified method for providing adaptive power supply to system on a chip according to an embodiment of the present invention. This diagram is merely an example, which should not unduly limit the scope of the claims. One of ordinary skill in the art would recognize many variations, alternatives, and modifications. The method 1100 includes the following processes:

1. Process 1110 for determining input/output component, analog component, and digital component;
2. Process 1120 for determining digital blocks;
3. Process 1130 for determining signal time delays for critical paths;
4. Process 1140 for forming one or more digital subsystems;
5. Process 1150 for providing power supply voltages to input/output component and analog component;
6. Process 1160 for providing one or more adaptive power supplies;
7. Process 1170 for providing signal connections between subsystems.

Although the above has been shown using a selected group of processes for the method 1100, there can be many alternatives, modifications, and variations. For example, some of the processes may be expanded and/or combined. Other processes may be inserted to those noted above. Depending upon the embodiment, the arrangement of processes may be interchanged with others replaced. For example, the method 1100 is used to design and/or make the system 1000. Further details of these processes are found throughout the present specification and more particularly below.

At the process 1110, an input/output component, an analog component, and a digital component are determined. For example, the input/output component, the analog component, and the digital component are parts of a system on a chip. The system on a chip is partitioned into at least the input/output component, the analog component, and the digital component. In another example, the input/output component is an input/output subsystem, and the analog component is an analog subsystem. In yet another example, the input/output component is the input/output subsystem 1010, and the analog component is the analog subsystem. 1020.

At the process 1120, digital blocks are determined. For example, the digital component is partitioned into the digital blocks. In another example, each digital block includes at least a part of a digital circuit. In yet another example, the system on a chip includes the digital component, and the digital component includes a hierarchy of circuit blocks. In another example, the determination of digital blocks is performed manually and/or automatically. In yet anther example, the determination of digital blocks uses one or more computer-aided-design (CAD) tools.

At the process 1130, signal time delays of critical paths are determined for the digital blocks. For example, the critical path of a digital block has a signal time delay that is longer than the signal time delay of any other signal path of the digital block. In another example, the critical path is determined by simulating the digital block with a timing simulator. In yet another example, different digital blocks include individual critical paths that have different, similar, or same individual signal time delays.

At the process 1140, one or more digital subsystems are formed. For example, the digital blocks are combined to form the digital subsystems according to at least the individual time delays of the individual critical paths. In another example, a digital subsystem includes one or more digital blocks. In yet another example, each of the digital subsystems includes digital blocks whose individual critical paths have similar individual signal time delays. In another example, the individual time delays of the digital blocks for a digital subsystem are significantly different from the individual time delays of the digital blocks for another digital subsystem. In yet another example, the digital subsystems are the digital subsystems 1030, 1032, and 1034.

At the process 1150, power supply voltages are provided to an input/output subsystem and an analog subsystem. For example, the power supply voltage for the input/output subsystem and the power supply voltage for the analog subsystem are the same or different. In another example, the input/output subsystem includes the input/output block, and the analog subsystem includes the analog block. In yet another example, the input/output subsystem is the input/ output subsystem 1010, and the analog subsystem is the analog subsystem 1020. The input/output subsystem 1010 is provided with a power supply voltage 1012 of $V_{DDIO}$, and the analog subsystem 1020 is provided with a power supply voltage 1022 of $V_{DDA}$.

At the process 1160, one or more adaptive power supplies are provided. For example, an adaptive power supply is provided to each of the one or more digital subsystems. The adaptive power supply can convert an input power supply voltage to an output power supply voltage, and output the output power supply voltage to the corresponding digital subsystem. In another example, each of the one or more digital subsystems includes a critical path. The critical path has a signal time delay that is longer than the signal time delay of any other signal path of the corresponding digital subsystem. The signal time delay of the critical path is used by the corresponding power supply to adaptively provide the power supply voltage.

In one embodiment, the one or more digital subsystems include the digital subsystems 1030, 1032, and 1034, and the adaptive power supplies include the adaptive power supplies 1040, 1042, and 1044. Each of the adaptive power supplies 1040, 1042, and 1044 converts the power supply voltage 1046 of $V_{DDD}$ to the power supply-voltage 1080, 1082, or 1084 as shown in FIG. 1.

At the process 1170, signal connections are provided between subsystems. For example, a digital signal connection can carry digital signals between two digital subsystems, between a digital subsystem and an analog subsystem, between a digital subsystem and an input/output subsystem, and/or between an analog subsystem and an input/output subsystem. In another example, a digital signal connections includes one or more level shifters for power level conversion. In yet another example, an analog signal connection can carry analog signals between an analog subsystem and an input/output subsystem.

In one embodiment, the digital signal connections 1050, 1052, and 1054 can carry digital signals between the digital subsystems 1030 and 1032, between the digital subsystems 1032 and 1034, and between the digital subsystem 1034 and the analog subsystem 1020 respectively. Additionally, the digital signal connections 1060, 1062, 1064, and 1066 can carry digital signals between the digital subsystem 1030 and the input/output subsystem 1010, between the digital subsystem 1032 and the input/output subsystem 1010, between the digital subsystem 1034 and the input/output subsystem 1010, and between the analog subsystem 1020 and the input/output subsystem 1010 respectively. For example, some or all of the digital signal connections 1050, 1052, 1054, 1060, 1062, 1064, and 1066 each include one or more level shifters for power level conversion. Moreover, the analog signal connection 1070 can carry analog signals between the analog subsystem 1020 and the input/output subsystem 1010.

Figure 3:
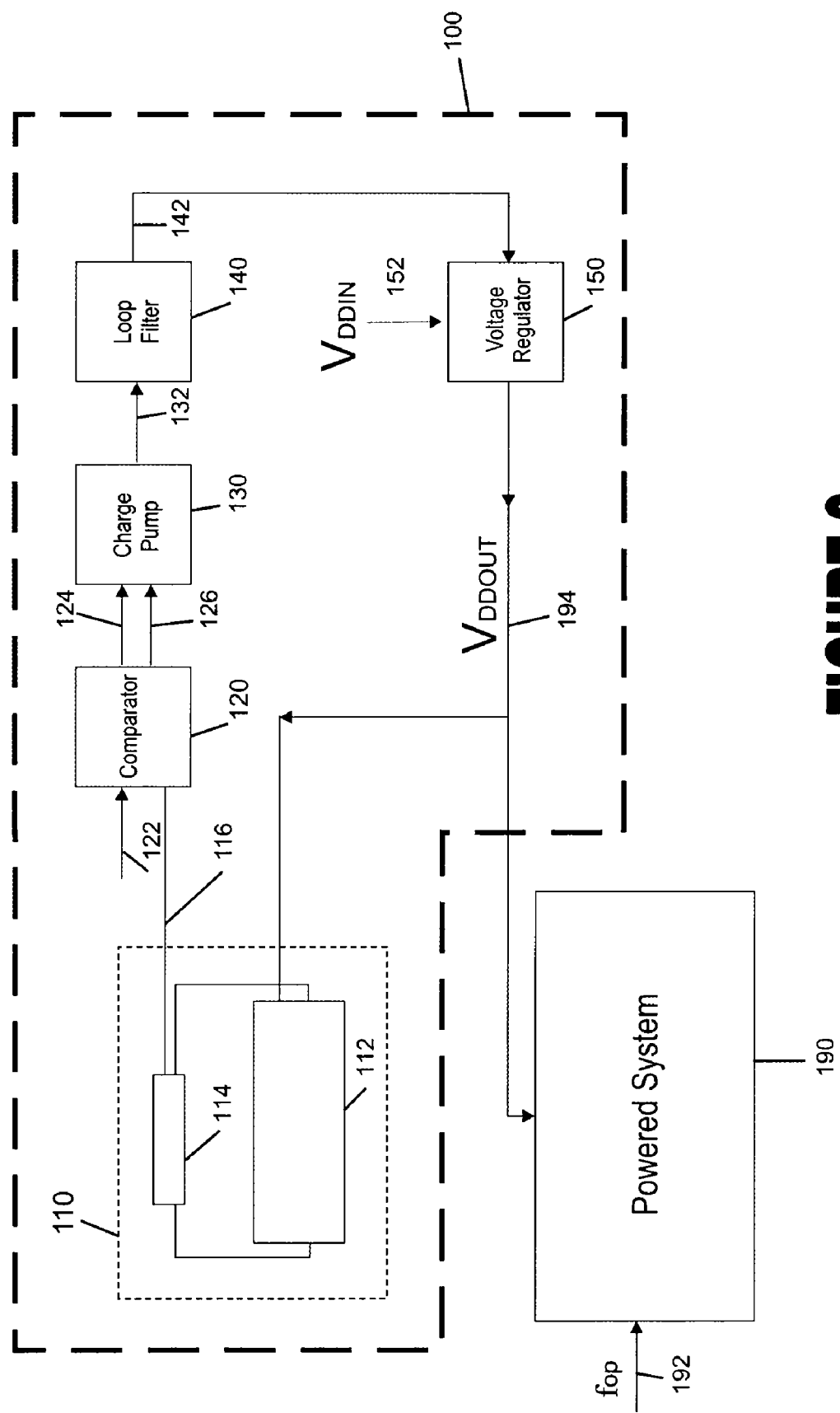
FIG. 3 is a simplified system for adaptive power supply according to an embodiment of the present invention.

FIG. 3 is a simplified system for adaptive power supply according to an embodiment of the present invention. This diagram is merely an example, which should not unduly limit the scope of the claims. One of ordinary skill in the art would recognize many variations, alternatives, and modifications. The system 100 includes the following components:

1. Oscillator 110;
2. Frequency comparator 120;
3. Charge pump 130;
4. Loop filter 140;
5. Voltage regulator 150.

Although the above has been shown using a selected group of components for the system 100, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

As shown in FIG. 3, the system 100 is used to adaptively supply power to a powered system 190. In one embodiment, the powered system 190 is an integrated circuit system. In another embodiment, the powered system 190 includes one or more blocks of an integrated circuit system. In yet another embodiment, the powered system 190 can slow down the system clock when the powered system 190 does not have to perform many tasks. In yet another embodiment, the powered system 190 adjusts the clock frequency based on at least information associated with a workload of the powered system 190. The powered system 190 receives a clock signal 192 with a frequency $f_{op}$, and an output power supply voltage 194 of $V_{DDOUT}$ from the system 100.

The oscillator 110 includes a delay path 112 and other oscillator components 114. Other oscillator components 114 are coupled to the delay path 112, and generate a signal 116 with a frequency $f_{var}$. In one embodiment, the frequency $f_{var}$ is equal to about $1/t_{delay}$. $t_{delay}$ represents time delay of the delay path 112. For example, it would take a signal $t_{delay}$ to travel through the delay path 112. As shown in FIG. 3, the delay path 112 receives the output power supply voltage 194 of $V_{DDOUT}$. For example, $t_{delay}$ depends on $V_{DDOUT}$.

In one embodiment, the powered system 190 includes a critical path whose time delay is longer than the time delay of any other signal path of the powered system 190. In another embodiment, the time delay $t_{delay}$ equals the time delay of the critical path of the powered system 190. For example, the time delay $t_{delay}$ is longer than the time delay of the critical path of the powered system 190 by a predetermined period. In another example, both the critical path of the powered system 190 and the delay path 112 are powered by the output power supply voltage 194 of $V_{DDOUT}$.

The frequency comparator 120 receives the signal 116 with the frequency $f_{var}$ and a signal 122 with the frequency $f_{op}$. For example, the signal 122 is the same as the signal 192. The frequency comparator 120 compares the two frequencies $f_{var}$ and $f_{op}$, and in response can send no signal, or one or more signals to the charge pump 130 through a signal path 122 and/or a signal path 124. In one embodiment, the frequency comparator 120 includes a phase-frequency detector. The phase-frequency detector compares the edges of the two signals 116 and 122 to determine whether the frequency $f_{var}$ is higher than, equal to, or lower than the frequency $f_{op}$. In another embodiment, if $f_{var}$ is lower than $f_{op}$, the frequency comparator 120 sends an up signal through the signal path 124. If $f_{var}$ is higher than $f_{op}$, the frequency comparator 120 generates a down signal through the signal path 126. If $f_{var}$ is equal to $f_{op}$, the frequency comparator 120 does not send the up signal or the down signal. In yet another embodiment, the up signal can cause the system 100 to raise the output power supply voltage 194 of $V_{DDOUT}$, and the down signal can cause the system 100 to lower the output power supply voltage 194 of $V_{DDOUT}$. In yet another embodiment, the up signal and the down signal each include signal pulses.

The charge pump 130 is coupled to the comparator 120 through the signal paths 124 and 126, and is coupled to the loop filter 140 through a current path 132. If the charge pump 130 receives the up signal, the charge pump 130 generates a sourcing current flowing from the charge pump 130 to the loop filter 140 over the current path 132. If the charge pump 130 receives the down signal, the charge pump 130 generates a sinking current flowing from the loop filter 140 to the charge pump 130 over the current path 132. If the charge pump 130 does not receive the up signal or the down signal, the charge pump 130 does not generate the sourcing current or the sinking current.

The loop filter 140 can receive and integrate the sourcing current or the sinking current and generate a reference voltage 142 of $V_{ref}$. For example, the loop filter 140 uses a damping process. In another example, the loop filter 140 uses a smoothing process to improve stability of the reference voltage 142. The reference voltage 142 is sent to the voltage regulator 150.

Figure 4:
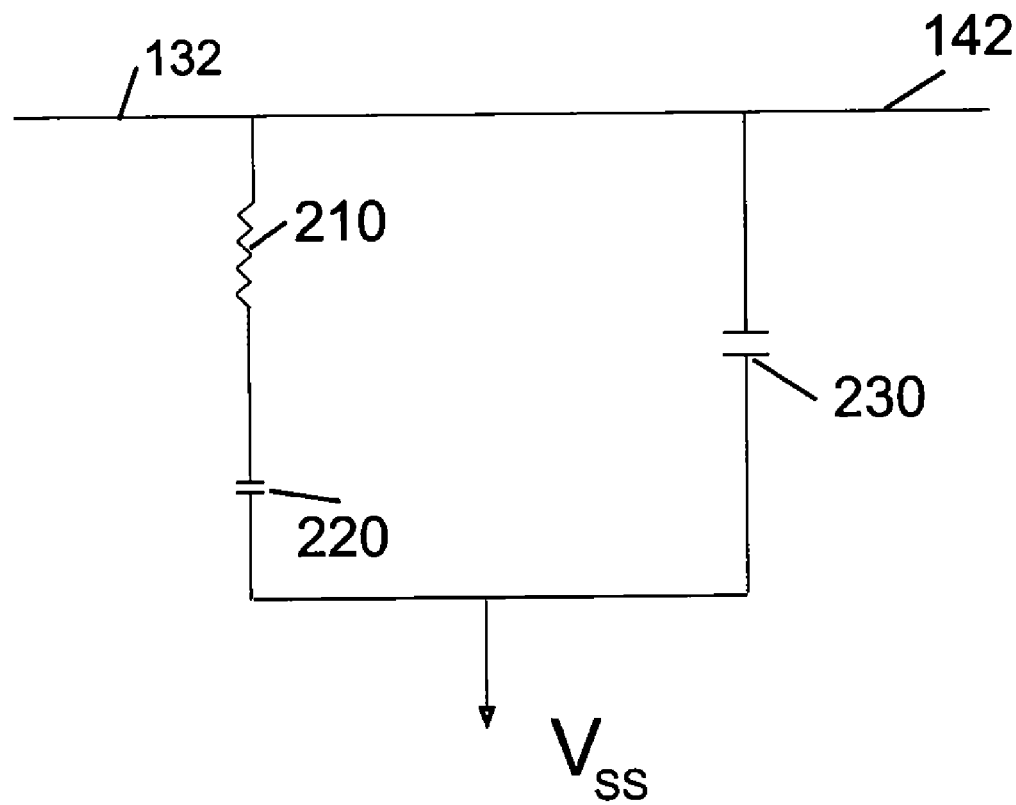
FIG. 4 is a simplified diagram showing a loop filter as part of a system for adaptive power supply according to an embodiment of the present invention.

FIG. 4 is a simplified diagram showing the loop filter 140 as part of the system 100 according to an embodiment of the present invention. This diagram is merely an example, which should not unduly limit the scope of the claims. One of ordinary skill in the art would recognize many variations, alternatives, and modifications. The loop filter 140 includes a resistor 210 and capacitors 220 and 230. The resistor 210 and the capacitor 220 are in series, and the capacitors 220 and 230 each have one terminal coupled to a voltage level of $V_{ss}$. For example, $V_{ss}$ represents the ground level. As shown in FIG. 4, the loop filter 140 is coupled to the charge pump through the current path 132, and sends the reference voltage 142 of $V_{ref}$ to the voltage regulator 150. Although the above has been shown using a selected group of components for the system 100, there can be many alternatives, modifications, and variations. For example, some of the components may be expanded and/or combined. Other components may be inserted to those noted above. Depending upon the embodiment, the arrangement of components may be interchanged with others replaced.

Returning to FIG. 3, the voltage regulator 150 receives the reference voltage 142 of $V_{ref}$, and an input power supply voltage 152 of $V_{DDIN}$. In response to the reference voltage 142, the voltage regulator 150 converts the input power supply voltage 152 of $V_{DDIN}$ to the output power supply voltage 194 of $V_{DDOUT}$. In one embodiment, $V_{DDOUT}$ has a linear relationship with $V_{ref}$. For example, $V_{DDOUT}$ equals $V_{ref}$ multiplied by a constant. In another example, $V_{DDOUT}$ equals $V_{ref}$ plus a constant. In yet another example, $V_{DDOUT}$ equals a first constant plus the product of $V_{ref}$ and a second constant. In another embodiment, the output power supply voltage 194 is used to power both the critical path of the powered system 190 and the delay path 112 of the oscillator 110. In yet another embodiment, the voltage regulator 150 includes a linear regulator and/or a switching-capacitor regulator.

According to one embodiment, each of the adaptive power supplies 1040, 1042, and 1044 includes the system 100, and the powered system 190 represents the digital subsystem 1030, 1032, or 1034. The input power supply voltage 152 of $V_{DDIN}$ is the power supply voltage 1046 of $V_{DDD}$, and the output power supply voltage 194 of $V_{DDOUT}$ represents the power supply voltage 1080, 1082, or 1084. For example, the system 100 is used as the adaptive power supply 1040, and the powered system 190 represents the digital subsystem 1030. The input power supply voltage 152 of $V_{DDIN}$ is the power supply voltage 1046 of $V_{DDD}$, and the output power supply voltage 194 of $V_{DDOUT}$ represents the power supply voltage 1080.

Figure 5:
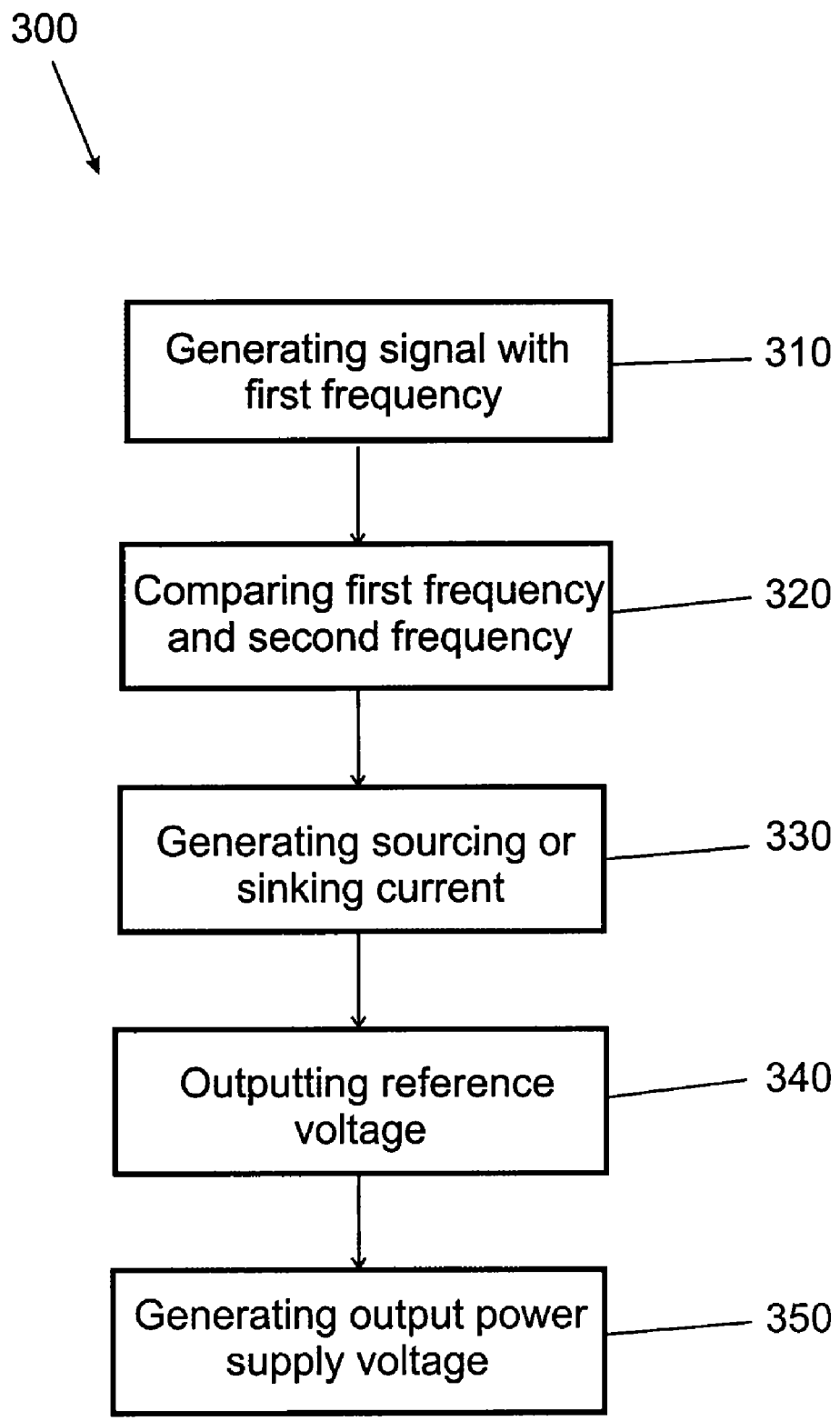
FIG. 5 is a simplified system for adaptive power supply according to an embodiment of the present invention.

FIG. 5 is a simplified method for adaptive power supply according to an embodiment of the present invention. This diagram is merely an example, which should not unduly limit the scope of the claims. One of ordinary skill in the art would recognize many variations, alternatives, and modifications. The method 300 includes the following processes:

1. Process 310 for generating signal with first frequency;
2. Process 320 for comparing first frequency and second frequency;
3. Process 330 for generating sourcing or sinking current;
4. Process 340 for outputting reference voltage;
5. Process 350 for generating output power supply voltage.

Although the above has been shown using a selected group of processes for the method 300, there can be many alternatives, modifications, and variations. For example, some of the processes may be expanded and/or combined. Other processes may be inserted to those noted above. Depending upon the embodiment, the arrangement of processes may be interchanged with others replaced. For example, the method 300 is performed by the system 100. In another example, the method 300 is performed by the adaptive power supply 1040, the adaptive power supply 1042, and/or the adaptive power supply 1044. Further details of these processes are found throughout the present specification and more particularly below.

At the process 310, a signal is generated with a first frequency. For example, the signal is generated by an oscillator that includes a delay path with a time delay. In one embodiment, the first frequency is equal to about the inverse of the time delay. In another embodiment, the time delay depends on an output power supply voltage.

For example, the output power supply voltage is used to supply power to a powered system. In one embodiment, the powered system is an integrated system. In another embodiment, the powered system includes one or more blocks of an integrated system. In yet another embodiment, the powered system can slow down the system clock when the powered system does not have to perform many tasks. In yet another embodiment, the powered system adjusts the clock frequency based on at least information associated with a workload of the powered system. The powered system includes a critical path whose time delay is longer than the time delay of any other signal path of the powered system.

In one embodiment, the time delay for the delay path of the oscillator equals the time delay of the critical path of the powered system. In another embodiment, the time delay for the delay path of the oscillator is longer than the time delay of the critical path of the powered system by a predetermined period. In yet another embodiment, both the critical path of the powered system and the delay path of the oscillator are powered by the output power supply voltage.

At the process 320, the first frequency and a second frequency are compared. For example, the second frequency is the frequency of a clock signal received by the powered system. In another example, the comparison includes comparing the edges of the two signals associated with the first frequency and the second frequency respectively. Based on the comparison of the first frequency and the second frequency, either no signal or a signal is generated. For example, if the first frequency and the second frequency are equal, no signal is generated. In another example, if the first frequency is lower than the second frequency, an up signal is generated. In yet another example, if the first frequency is higher than the second frequency, a down signal is generated. In one embodiment, the up signal can cause the output power supply voltage to increase, and the down signal can cause the output power supply voltage to decrease. In another embodiment, the up signal and the down signal each include signal pulses.

At the process 330, a sourcing current or sinking current is generated. For example, if an up signal is received, the sourcing current is generated. If a down signal is generated, the sinking current is generated. In another example, the sourcing current flows from a charge pump, and the sinking current flows to the charge pump. If neither the up signal nor the down signal is received, neither the sourcing current nor the sinking current is generated.

At the process 340, a reference voltage is outputted. For example, the sourcing current or the sinking current are integrated to generate the reference voltage. In another example, a damping process is used. In yet another example, a smoothing process is used to improve stability of the reference voltage.

At the process 350, an output power supply voltage is generated in response to the reference voltage. For example, an input power supply voltage is converted to the output power supply voltage based on at least the reference voltage. In one embodiment, $V_{DDOUT}$ has a linear relationship with $V_{ref}$. For example, $V_{DDOUT}$ equals $V_{ref}$ multiplied by a constant. In another example, $V_{DDOUT}$ equals $V_{ref}$ plus a constant. In yet another example, $V_{DDOUT}$ equals a first constant plus the product of $V_{ref}$ and a second constant. In another embodiment, the output power supply voltage is used to power both the critical path of the powered system and the delay path of the oscillator.

According to another embodiment, a system for adaptively providing a power supply voltage includes an input/output subsystem configured to receive a first voltage, an analog subsystem configured to receive a second voltage and coupled to the input/output subsystem, a first digital subsystem configured to receive a third voltage and coupled to the input/output subsystem, and a second digital subsystem configured to receive a fourth voltage and coupled to the input/output subsystem, the first digital subsystem, and the analog subsystem. Additionally, the system includes a first adaptive power supply configured to receive an input voltage and generate the third voltage, and a second adaptive power supply configured to receive the input voltage and generate the fourth voltage. The first digital subsystem is configured to receive a clock signal associated with a clock frequency, and the first adaptive power supply is further configured to adjust the third voltage based on at least information associated with a comparison of a first frequency and the clock frequency. For example, the system is implemented according to the system 1000.

According to yet another embodiment, a system for adaptively providing a power supply voltage includes an input/output subsystem configured to receive a first voltage, an analog subsystem configured to receive a second voltage and coupled to the input/output subsystem, a first digital subsystem configured to receive a third voltage and coupled to the input/output subsystem, and a second digital subsystem configured to receive a fourth voltage and coupled to the input/output subsystem, the first digital subsystem, and the analog subsystem. The first digital subsystem includes a first critical path associated with a first time delay, and the second digital subsystem includes a second critical path associated with a second time delay. The third voltage is determined based on at least information associated with the first time delay, and the fourth voltage is determined based on at least information associated with the second time delay. For example, the system is implemented according to the system 1000.

According to yet another embodiment, a method for adaptively providing a power supply voltage includes determining an input/output component, an analog component, and a digital component. The input/output component, the analog component, and the digital component are parts of a system. Additionally, the method includes processing information associated with the digital component, and determining a plurality of digital blocks based on at least information associated with the digital component. The digital component includes the plurality of digital blocks, and each of the plurality of digital blocks includes at least a part of a digital circuit. Moreover, the method includes processing information associated with the plurality of digital blocks, and determining a plurality of signal time delays associated with a plurality of critical paths corresponding to the plurality of digital blocks respectively based on at least information associated with the plurality of digital blocks. Also, the method includes processing information associated with the plurality of signal time delays, and forming a plurality of digital subsystems based on at least information associated with the plurality of signal time delays. Each of the plurality of digital subsystems includes one or more digital blocks. Additionally, the method includes providing a plurality of power supplies to the plurality of digital subsystems respectively. Each of the plurality of digital subsystems includes a critical path associated with a time delay, and each of the plurality of power supplies outputs a first voltage to corresponding one of the plurality of digital subsystems. The first voltage is determined based on at least information associated with the corresponding time delay. For example, the method is implemented according to the method 1100.

The present invention has various advantages. Some embodiments of the present invention can adaptively provide power supply voltages to a system on a chip, and thus significantly reduce power consumption of the system. Certain embodiments of the present invention divide a system-on-a-system chip into several subsystems. For example, the subsystems include an input/output subsystem, an analog subsystem, and one or more digital subsystems. In another example, the input/output subsystem and the analog subsystem are provided with constant supply voltages. In yet another example, each of the one or more digital subsystems is powered by an adaptive power supply system. Some embodiments of the present invention provide digital signal connections between different power domains. For example, the digital signal connections include level-shifters to protect signal integrity and/or eliminate DC current.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system for adaptively providing a power supply voltage, the system comprising:
  an input/output subsystem configured to receive a first voltage;
  an analog subsystem configured to receive a second voltage and coupled to the input/output subsystem;
  a first digital subsystem configured to receive a third voltage and coupled to the input/output subsystem;
  a first adaptive power supply configured to receive an input voltage and generate the third voltage;
  wherein:
    the first digital subsystem is configured to receive a clock signal associated with a clock frequency;
    the first adaptive power supply is further configured to adjust the third voltage based on at least information associated with a comparison of a first frequency and the clock frequency.

2. The system of claim 1 wherein:
  the first digital subsystem includes a plurality of digital blocks;

the plurality of digital blocks are associated with a plurality of critical paths respectively;

the plurality of critical paths are related to a plurality of signal time delays respectively;

the plurality of signal time delays are substantially equal.

3. The system of claim 1, and further comprising:

a second digital subsystem coupled to the input/output subsystem;

a first digital connection configured to carry a first plurality of digital signals between the first digital subsystem and the second digital subsystem;

a second digital connection configured to carry a second plurality of digital signals between the second digital subsystem and the analog subsystem.

4. The system of claim 3, and further comprising:

a third digital connection configured to carry a third plurality of digital signals between the first digital subsystem and the input/output subsystem;

a fourth digital connection configured to carry a fourth plurality of digital signals between the analog subsystem and the input/output subsystem.

5. The system of claim 4 wherein each of the first digital connection, the second digital connection, the third digital connection, and the fourth digital connection comprises one or more level shifters.

6. The system of claim 1 wherein the third voltage is adjusted if the first frequency and the clock frequency are not equal.

7. The system of claim 1 wherein the first digital subsystem is configured to adjust the clock frequency based on at least information associated with a workload of the first digital subsystem.

8. The system of claim 1 wherein:

the first digital subsystem includes a first signal path associated with a first time delay;

the first adaptive power supply comprises:

a frequency comparator configured to receive a first signal associated with the first frequency and a first period, to receive a second signal associated with the clock frequency, and to generate a third signal if the first frequency and the clock frequency are not equal;

a voltage regulator coupled to the frequency comparator and configured to generate the third voltage based on at least information associated with the third signal;

wherein:

the first period is equal to or longer than the first time delay.

9. The system of claim 8 wherein the second signal and the clock signal are the same.

10. The system of claim 8 wherein the first adaptive power supply further comprises an oscillator configured to receive the third voltage and generate the first signal associated with the first frequency and the first period.

11. The system of claim 10 wherein:

the oscillator includes a second signal path associated with a second time delay;

the second time delay is substantially equal to the first period.

12. The system of claim 8 wherein:

the first digital subsystem further includes other signal paths associated with corresponding other time delays;

each of the other time delays is shorter than the first time delay.

* * * * *